United States Patent
Konda et al.

(10) Patent No.: US 9,284,466 B2
(45) Date of Patent: Mar. 15, 2016

(54) ACTIVE ENERGY RAY-CURABLE INKJET INK SET

(71) Applicants: TOYO INK SC HOLDINGS CO., LTD., Tokyo (JP); TOYO INK CO., LTD., Tokyo (JP)

(72) Inventors: Yohei Konda, Tokyo (JP); Yuji Kameyama, Tokyo (JP); Kazuhiro Jonai, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 13/855,965

(22) Filed: Apr. 3, 2013

(65) Prior Publication Data

US 2013/0303682 A1    Nov. 14, 2013

(30) Foreign Application Priority Data

Apr. 9, 2012 (JP) ................... 2012-088541

(51) Int. Cl.
- *C09D 11/40* (2014.01)
- *C09D 11/101* (2014.01)
- *C09D 11/38* (2014.01)

(52) U.S. Cl.
CPC .............. *C09D 11/40* (2013.01); *C09D 11/101* (2013.01); *C09D 11/38* (2013.01)

(58) Field of Classification Search
CPC .............................. C09D 11/40; C09D 11/101
USPC .......................................................... 523/160
See application file for complete search history.

(56) References Cited

U.S. PATENT DOCUMENTS

| | | | |
|---|---|---|---|
| 8,197,584 | B2 | 6/2012 | Claes et al. |
| 2008/0055385 | A1 | 3/2008 | Houjou |
| 2009/0085996 | A1 | 4/2009 | Kasai |
| 2010/0047454 | A1* | 2/2010 | De Voeght et al. ............ 427/256 |
| 2010/0302300 | A1 | 12/2010 | Verdonck |
| 2011/0045199 | A1* | 2/2011 | Cong ............................ 427/487 |
| 2013/0096225 | A1 | 4/2013 | Verdonck |

FOREIGN PATENT DOCUMENTS

| | | |
|---|---|---|
| CN | 101522827 A | 9/2009 |
| EP | 2 053 099 A1 | 4/2009 |
| JP | 7-9755 A | 1/1995 |
| JP | 2005-518971 A | 6/2005 |
| JP | 2009-83267 A | 4/2009 |
| JP | 2010-46945 A | 3/2010 |
| WO | WO 2011/076703 A1 | 6/2011 |

OTHER PUBLICATIONS

Japanese Office Action Issued Feb. 19, 2013 in Patent Application No. 2012-088541 (with partial English translation).
Extended European Search Report issued Jun. 5, 2014, in European Patent Application No. 13162653.3.
Japanese Office Action issued Aug. 5, 2014 in Patent Application No. 2014-077403 (with English Translation).
Japanese Office Action issued Jan. 7, 2014 in Patent Application No. 2012-088541 (with English Translation).
Japanese Office Action issued Sep. 17, 2013 in Patent Application No. 2012-088541 (with English Translation).
Japanese Office Action issued Jun. 11, 2013 in Patent Application No. 2012-088541 (with English Translation).
Chinese Office Action issued on Aug. 28, 2015 in corresponding Chinese Patent Application No. 201310120323.X and English translation thereof, 17 pp.

* cited by examiner

*Primary Examiner* — Doris Lee
(74) *Attorney, Agent, or Firm* — Oblon, McClelland, Maier & Neustadt, L.L.P.

(57) ABSTRACT

To provide an active energy ray-curable inkjet ink set including ink of at least two different colors, wherein a blending amount of a surface tension adjusting agent to be blended in ink of each color is 1.0 to 5.0% by weight with respect to a total amount of the ink of each color, a difference in the blending amount of the surface tension adjusting agent in the ink of each color is 0.5% by weight or less with respect to a total amount of the ink of each color according to an order of printing, and a difference between maximum and minimum in the blending amount of the surface tension adjusting agent in the ink of each color is made to be 2% by weight or less.

3 Claims, No Drawings

ACTIVE ENERGY RAY-CURABLE INKJET INK SET

TECHNICAL FIELD

The present invention relates to an active energy ray-curable coloring inkjet ink set. In particular, the present invention relates to providing of an ink suitable for a one-pass curable printer.

BACKGROUND ART

Conventionally, active energy ray-curable inkjet ink has been installed on high-speed printing type signage printers from the viewpoint of the speed of dryness and the reduction of environmental load as compared with the solvent type ink. Alternatively, the active energy ray-curable inkjet ink is installed on a flat bed type printer corresponding to various base materials from the viewpoint that base material adhesion property is excellent. Then, development of ink formula according to these applications has been made.

However, printed matter having poor in leveling property of dots, glossing property, and color reproductivity has been obtained very often because of the speed of dryness. Therefore, quality of printing has not been acceptable in the market in some cases. In particular, it has been difficult to be applied to the market of high-quality printing.

In order to solve this problem, in printers in which a head scans a base material and superimposition printing is carried out, it has been possible to obtain high quality images by adjusting deposition positions of dots, lamp timing, or the like. However, since in one-pass type printers, which have been developed in recent years, dots of each color are printed in one layer, it has been difficult to adjust deposition positions of dots and hardening timing, so that it has not been possible to obtain high quality images.

Furthermore, when printing is carried out on coated paper and cast paper having a coated layer, due to unevenness in painting or variation in the surface state of the coated layer, ink spreads in indefinite directions, so that dots which cannot be controlled are formed. As a result, it was not possible to obtain printed matter having high image quality.

Hereinafter, approaches for obtaining high image quality in ink-jet printing disclosed before the present invention was made are described.

Patent Literature 1 discloses an approach for obtaining printed matter having high image quality by controlling the surface tension of each color in water-based ink, thereby controlling spread or penetration of colors. However, since this invention controls the penetration, leveling of dots at the time of drying cannot be sufficiently controlled, so that small dots are formed. With this method, in superimposing printing, ink for complementing between dots can be subjected to printing repeatedly. However, when printing is carried out by using a one-pass type printer, superimposing printing of the same color cannot be carried out. Therefore, in ink whose leveling of dots is controlled, stripes remarkably occur in 100% printed portion. Furthermore, because leveling of dots are suppressed, a beading phenomenon in which dots originally occurring in 10 to 30% printed portion are fused to each other occurs in 50 to 80% printed portion. As a result, printed matter with an extremely low quality of image was obtained. Furthermore, since the amount of a surface-active agent to be used was small, when printing is carried out on coated paper, remarkable distortion of dots occurred. When the surface-active agent was added to an active energy ray-curable ink of the present invention, the function of adjusting the surface tension was not able to be sufficiently obtained, thus making controlling impossible.

CITATION LIST

Patent Literature

Patent Literature 1: Japanese Patent Application Laid-Open No. 7-9755

SUMMARY OF INVENTION

With an ink set in accordance with an embodiment of the present invention, it is possible to obtain printed matter with extremely high quality in active energy ray-curable inkjet printing. When base material having a coated layer is used not only in scanning type printer but also, in particular, in a one-pass type printer, a high quality image can be obtained. Furthermore, since quality stability of ink after storage is also excellent, practically, sufficient use time can be achieved.

That is to say, the embodiment of the present invention relates to an active energy ray-curable inkjet ink set including ink of at least two different colors, wherein a blending amount of a surface tension adjusting agent to be blended in ink of each color is 1.0 to 5.0% by weight with respect to a total amount of the ink of each color, a difference in the blending amount of the surface tension adjusting agent of each color is 0.5% by weight or less according to an order of printing, and a difference between maximum and minimum in the blending amount of the surface tension adjusting agent in the ink of each color is made to be 2% by weight or less.

Furthermore, the embodiment of the present invention relates to the energy ray-curable inkjet ink set in which the surface tension adjusting agent is a silicone base.

Furthermore, the embodiment of the present invention relates to the energy ray-curable inkjet ink set in which two kinds or more of the surface tension adjusting agents are used.

Furthermore, the embodiment of the present invention relates to the active energy ray-curable inkjet ink set in which 50 to 95% by weight of monomer having EO or PO as a main skeleton is used with respect to the total amount of the ink.

In addition, the embodiment of the present invention relates to the active energy ray-curable inkjet ink set which is used for a one-pass printer in which ink is discharged by at least two or more inkjet heads and then the discharged ink is hardened at the same time.

Disclosure of the present specification relates to the subject matter described in Japanese Patent Application No. 2012-088541 filed on Apr. 9, 2012, and entire disclosure thereof is hereby incorporated by reference.

DESCRIPTION OF EMBODIMENTS

A surface tension adjusting agent to be blended in the present embodiment signifies a substance that is to be added for reducing the surface tension. The reducing ability thereof generally varies depending upon ink media. For example, when the medium is water, the surface tension adjusting agent includes an additive type agent such as acetylenediol, a solvent type agent such as isopropyl alcohol. In the present embodiment, since a main component of the ink is a reactive monomer, examples of the surface tension adjusting agent include silicone-based additives, hydrophobic monomers, and hydrophobic organic solvents. Furthermore, since effects are different depending upon monomers to be actually used, the surface tension adjusting agent in the present embodiment signifies a material having ability to reduce the static surface tension when 1% by weight thereof is added by 3 mN/m or more with respect to the ink before the additive is added.

The blending amount of the surface tension adjusting agent is 1.0 to 5.0% by weight, and preferably 1.5 to 3.5% by weight with respect to the total amount of each ink from the viewpoint of improvement of wettability with respect to many base materials.

Specific examples of the silicone-based additive include a modified product having a dimethyl siloxane skeleton. General products include BYK (registered trademark)-378 and BYK-348 which are representative products manufactured by BYK Japan KK, TEGO (registered trademark) Glide 450, TEOG Glide 432, and the like, manufactured by Evonik Degussa Japan Co., Ltd. Furthermore, these silicone-based additives were confirmed to have ability to reduce the static surface tension by 3 mN/m or more when 1% by weight thereof is added with respect to the ink before use. In order to correspond to various paper-base materials, it is more preferable that a silicone-based additive capable of reducing the static surface tension by 4 mN/m or more with respect to the ink can be suitably used. These silicone-based additives can be used singly or in combination with other additives depending upon applications of use and purposes. However, since the amount to be used in the present embodiment is larger as compared with common knowledge, a printing effect may be changed over time. This is thought to be because the silicone-based additives generally have poor compatibility and therefore cause phase separation when the silicone-based additives are added in a large amount. Therefore, preferably, use of two types or more of silicone-based additives can prevent cissing of a coated film, which is derived from localization of the additives due to phase separation, and prevent deterioration of image quality. Furthermore, from the viewpoint of the phase separation, it is preferable to use one or more types of polyether-modified additives as the silicone-based additive to be used. Addition of the additives into the ink is particularly effective for improving the monochrome printing quality with respect to paper-based base material having a coated layer.

Furthermore, it has been found that an excellent image can be obtained when the difference in the blending amount of the above-mentioned surface tension adjusting agent in the ink of each color is 0.5% by weight or less. This adjustment of the blending amount according to the order of printing can be changed in accordance with specifications of a printer. In a method of printing with different ink depending upon heads by one-pass method, an ink set in which the adding amount is increased in the range of 0.5% by weight or less is preferable. Furthermore, when these ink sets have three or more colors, it is necessary that a difference between the maximum blending amount and the minimum blending amount is 2% by weight or less. When printing is carried out by using an ink set having a difference larger than this amount, balance among dots is lost, so that a high quality image cannot be obtained. In order to obtain a higher quality image, the blending amount is further preferably 1.5% by weight or less. The adjustment of the balance of the ink has a large effect on the obtained image quality, and the present embodiment is not limited to conditions such as orders of printing colors and the number of heads of different colors. Actually, in the present embodiment, it is assumed that dynamic surface tension of ink has a large effect on the printing quality. Actually, when dots discharged from the first head and deposited are brought into contact with dots discharged from the second head have a similar dynamic surface tension of dots, it is possible to obtain high quality image. This fact can be matched to any printer specifications, and the maximum effect of the present embodiment can be obtained.

In the present embodiment, in each color of the ink set, the same surface tension adjusting agent is used and a case in which the added amount of the surface tension adjusting agent is the same is not included. A beading phenomenon in which the precedent color and the subsequent color are overlapped onto each other as shown in the column of Background Art may occur, when all the ink contains the same type of surface tension adjusting agent in the same amount.

The ink set in accordance with the present embodiment refers to a coloring ink set. Specifically, a coloring ink of basic colors such as yellow, magenta, cyan, and black, and a combination of a coloring ink of basic colors and a feature ink of corporate colors may be employed. However, since an anchor coating agent which is free from a coloring agent, white ink mainly used as a base paint, the overcoat varnish, and the like, cannot have the effect of the present embodiment, they do not correspond to the ink set in accordance with the present embodiment.

In other words, the ink set in accordance with the present embodiment may include an anchor coating agent, white ink, and the like, which do not contain an organic pigment. The requirement of the ink set in accordance with the present embodiment: "each ink comprises a surface tension adjusting agent in an amount of 1.0 to 5.0% by weight with respect to a total amount of each ink, a difference in the amount of the surface tension adjusting agent in each ink is 0.5% by weight or less with respect to a total amount of each ink according to an order of printing, and a difference between maximum and minimum in the amount of the surface tension adjusting agent in each ink is 2% by weight or less" is not applied for an anchor coating agent, white ink, and the like, which do not contain an organic pigment.

The surface tension in the present embodiment denotes generally-called static surface tension. A measurement method can be carried out by measuring wetted portions of platinum plate by a Wilhelmy method. Examples of standard measurement machine include DY-700 (manufactured by Kyowa Interface Science Co., Ltd.).

The present embodiment can be suitably used for a one-pass printer of discharging an ink by at least two or more of ink jet heads, and then hardening the inks simultaneously. The one-pass printer signifies a printer in which one ink jet head carries out a single time printing. In general, the printer generally includes a type (pin-cure type) for fixing ink by irradiations with UV between heads and a type (pin cureless type) of hardening ink without fixing thereof. The pin-cure type needs at least four lamps for four-color printing, for instance, thus increasing the device cost, and further increasing the size of the device. Therefore, the applications of use are limited in many cases and therefore they are unlikely to be prevailed. In the present embodiment, not only a pin-cure type, but also in particular, a pin cureless type printer can provide printed matter with high image quality.

The monomers to be used in the present embodiment can be selected freely as long as the purposes are not prevented. The monomer defined in the present embodiment denotes a compound which causes a polymerization reaction directly or via a photoinitiator after irradiation with active energy ray. Specific examples of the compound include acrylic monomers such as monofunctional acrylic monomer, bifunctional acrylic monomer, trifunctional or higher acrylic monomer, or vinyl monomer, vinyl ether monomer, heteromonomer including acryl and vinyl in the molecule thereof, or the like. Among them, the bifunctional monomer selected from DPGDA (dipropylene glycol diacrylate), VEEA (2-(2-hydroxy ethoxy)ethyl acrylate), and DVE-3 (triethylene glycol divinyl ether) can be suitably used because it has high sensitivity, or relatively low viscosity. Furthermore, the above-mentioned monomer is compatible with silicone-based additives, does not easily cause cissing. Therefore, it can be used in an amount of preferably 50 to 95% by weight, and more preferably 60 to 80% by weight with respect to the total amount of ink. Specifically, it is preferable that a monomer including ethylene oxide (EO) or polyethylene oxide (PO) as a main skeleton is used. The monomer containing EO or PO as a main skeleton in the present embodiment denotes a monomer having an EO group or a PO group at the site of other than a reactive group. Examples of the reactive group include an acryloyl group, a vinyl group, and a vinyl ether group.

In order to harden with UV lamp, an optical radical polymerization initiator can be used. The optical radical polymerization initiator can be selected freely according to hardening speeds, physical properties of hardened coating, and coloring materials. Specifically, benzoin isobutyl ether, 2,4-diethyl thioxanthone, 2-isopropyl thioxanthone, 2,4,6-trimethylbenzoyl diphenyl phosphine oxide, 2-benzyl-2-dimethylamino-1-(4-morpholino phenyl)-butane-1-one, bis(2,4,6-dimethoxybenzoyl)-2,4,4-trimethylpentyl phosphine oxide, 2-methyl-1-(4-methyl thiophenyl)-2-morpholinopropane-1-one, oligo(2-hydroxy-2-methyl-1-(4-(1-methyl vinyl)phenyl)propanone), 4-benzoyl-4'-methyl-diphenylsulfide, 1,2-octanedione, 1-(4-(phenylthio)-2,2-(O-benzoyloxime)), and the like are preferably used. The added amount of the optical radical polymerization initiator is preferably 3 to 20% by weight, and more preferably 5 to 18% by weight with respect to the total amount of ink.

Furthermore, as a sensitizer, amines such as trimethylamine, methyl dimethanolamine, triethanolamine, p-diethyl aminoacetophenone, p-dimethyl ethyl aminobenzoate, p-dimethyl isoamyl aminobenzoate, N,N-dimethyl benzylamine and 4,4'-bis(diethylamino)benzophenone, which do not cause an addition reaction with the polymerization compounds, can be used together with the above-mentioned optical radical polymerization initiator. The added amount of the sensitizer is preferably 1 to 20% by weight, and more preferably 3 to 15% by weight with respect to the total amount of ink.

In the present embodiment, pigment and dye can be used as a coloring agent. In particular, from the viewpoint of excellent light resistance and solvent resistance, it is preferable that pigment is dispersed and used. As the pigment, pigment to be used for printed product in printing and painting can be generally used, and it can be selected depending upon necessary applications of use, for example, coloring property, light resistance, and the like. As the pigment component, pigment having achromatic colors including, for example, carbon black, titanium oxide, and calcium carbonate, or organic pigment having chromatic colors can be used. As the organic pigment, PV19, PR122, PR176, PR185, PR202, PR269, PY120, PY139, PY150, PY151, PY155, PY180, PY185, PB15:3, PB15:4, PG7, PG36, PO43, PV23, and PB7 can be preferably used because they are excellent in light resistance. The added amount of the coloring agent is preferably 0.5 to 5% by weight, and more preferably 1 to 4% by weight with respect to the total amount of ink when the organic pigment is used.

The viscosity of the ink is preferably 5 to 14 mPa sec at 25° C. The viscosity of 5 mPa sec or more gives excellent discharging property, and the viscosity of 14 mPa sec or less gives excellent discharging accuracy.

To the ink to be used in the present embodiment, antifoaming agent, fluidity modifier, fluorescent whitening agent, polymerization inhibitor, oxidation inhibitor, or the like, can be used as long as a desired quality can be satisfied.

The viscosity can be adjusted by adding a solvent as long as high sensitivity can be realized. The solvent denotes a liquid which does not have reactivity. When a large amount of solvent is blended, hardening property is inhibited. Therefore, the added amount of the solvent is preferably 5% by weight or less with respect to the amount of ink.

The printing method in accordance with the present embodiment includes a step of preparing an active energy ray-curable inkjet ink set of the present embodiment, and a step of printing with each ink in such an order that the difference of the blending amount of the surface tension adjusting agents in ink of each color is 0.5% by weight or less with respect to the total amount of ink of each color.

Hereinafter, the present invention is described in more detail with reference to Examples, but the following Examples are not construed to limit the scope of right of the present invention. Note here that "part" denotes "part by weight" in Examples.

(Production of Pigment Dispersion Product)

Raw materials described in Table 1 were mixed according to the blending amounts, the mixed product was dispersed by using Eiger mill for one hour to obtain pigment dispersion products A to G. For dispersing, 1 mm-diameter Zr beads were used at the volume filling rate of 75%.

(Production of Ink)

A mixed solution of monomers and initiators described in Tables 2 and 3 were slowly added to the obtained pigment dispersion product and stirred. Thereafter, surface tension adjusting agents described in Tables 2 and 3 were added to the mixture, and then shaken in a shaker for six hours so as to produce ink. The obtained ink was filtered through PTFE filter having a pore diameter of 0.5 micron, and bulky particles are removed, thus adjusting ink for evaluation.

(Evaluation of Ink)

The adjusted ink was subjected to printing by using One Pass JET manufactured by TRYTECH Co., Ltd. The adjusted ink was poured into a head manufactured by KYOCERA Corporation by using a syringe, printing was carried out at a head temperature of 40° C., and hardening was carried out by using an UV lamp (240 W) manufactured by Nordson Corp. Then, the output images were evaluated. As an image to be used for evaluation, an image of bicycle of the ISO standard image No. 5 was used. As evaluation paper, paper obtained by cutting OK top coat+coated paper (manufactured by Oji Holdings Corporation) into a suitable size was used. For evaluation, an image having the same image quality as that of standard offset printing sample was evaluated as best quality, and an image printed in a standard color mode by using a toner printer for office (Docu-Centre-IVC2270: Fuji Xerox Co., Ltd.) was evaluated as image having quality of practical use. The evaluation was carried out by visual observation.

⊙: Image quality of offset level
○: Image quality same as that by toner printer
Δ: Image quality inferior to that by toner printer
x: Bad image quality including beading, letter crushes, poor development of color, etc.

In evaluation of the image quality, the point which prime importance was placed was comparison of quality with respect to existent printing when entire printed matter was observed, but results of observation of the sharpness of dots in high printed parts and low printed parts, and mixture of colors, and the like, under optical microscope, were also considered.

(Evaluation of Ink Over Time)

The evaluations the same as the above were carried out after the above-mentioned ink had been stored at 45° C. for one week. Evaluation means and evaluation standards were made to be the same as those in the initial ink evaluation.

(Evaluation Results)

Evaluation results are shown in Tables 2 and 3. Ink was filled in heads such that printing was carried out in an ascending order of the ink set numbers in Tables, and printing was carried out. Examples 1 to 12 showed results that excellent practical quality was obtained not only immediately after the ink was produced, but also after storage over time. Comparative Example 1 showed a result that leveling of dots was remarkably bad. In Comparative Example 2, practical level of an image was not able to be obtained. Comparative Example 3 showed that the image quality at the initial time was in a practical level, but spots occurred in the image after storage over time, thus showing that the ink was deteriorated. In Comparative Example 4, an image in which colors were mixed and ink spread was obtained. In Comparative Example 5, five-color printing was carried out in such a manner that two magenta colors having different hues were used as if two colors had been used. Spread of the ink occurred particularly in two magenta colors, so that excellent image quality could not be obtained.

TABLE 1

| Pigment dispersion product | Color Index | Pigment | Blending ratio Manufacturer | Blending amount | Dispersed resin | Blending amount | Dispersed monomer | Blending amount |
|---|---|---|---|---|---|---|---|---|
| A | Pigment Violet 19 | Hostaperm Red E5 B 02 | Clariant (Japan) K.K. | 20.0 | Solsperse 32000 | 12.5 | Laromer DPGDA | 67.5 |
| B | Pigment Red 122 | Hostaperm Pink E | Clariant (Japan) K.K. | 20.0 | Solsperse 32000 | 12.5 | | 67.5 |
| C | Pigment Yellow 180 | Novoperm Yellow P-HG | Clariant (Japan) K.K. | 20.0 | Solsperse 32000 | 12.5 | | 67.5 |
| D | Pigment Yellow 185 | Paliotol Yellow D 1155 | BASF | 20.0 | Solsperse 32000 | 12.5 | | 67.5 |
| E | Pigment Blue 15:3 | Lionol Blue 7351 | TOYOCHEM CO., LTD. | 20.0 | Solsperse 32000 | 12.5 | | 67.5 |
| F | Pigment Blue 15:4 | Lionol Blue 7400G | TOYOCHEM CO., LTD. | 20.0 | Solsperse 32000 | 12.5 | | 67.5 |
| G | Pigment Black 7 | Special Black 350 | Evonik Degussa Japan | 20.0 | Solsperse 32000 | 12.5 | | 67.5 |

Solsperse 32000: Product manufactured by Lubrizol Corporation

TABLE 2

| | | Examples | | | | | | | | | | | | | | | |
|---|---|---|---|---|---|---|---|---|---|---|---|---|---|---|---|---|---|
| | | Example 1 | | | | Example 2 | | | | Example 3 | | | | Example 4 | | | |
| Pigment dispersion product | | 1-1 | 1-2 | 1-3 | 1-4 | 2-1 | 2-2 | 2-3 | 2-4 | 3-1 | 3-2 | 3-3 | 3-4 | 4-1 | 4-2 | 4-3 | 4-4 |
| | A | 20 | | | | 20 | | | | | | | | | | | |
| | B | | | | | | | | | 20 | | | | 20 | | | |
| | C | | 20 | | | | 20 | | | | | | | | | | |
| | D | | | | | | | | | | 20 | | | | 20 | | |
| | E | | | 20 | | | | 20 | | | | | | | | | |
| | F | | | | | | | | | | | 20 | | | | 20 | |
| | G | | | | 20 | | | | 20 | | | | 20 | | | | 20 |
| Monomer | Laromer DPGDA | 35 | 35 | 35 | 35 | 35 | 35 | 35 | 35 | 35 | 35 | 35 | 35 | 35 | 35 | 35 | 35 |
| | VEEA | 35 | 35 | 35 | 35 | 35 | 35 | 35 | 35 | 35 | 35 | 35 | 35 | 35 | 35 | 35 | 35 |
| | DVE-3 | | | | | | | | | | | | | | | | |
| | Viscoat 260 | | | | | | | | | | | | | | | | |
| | SR 595 | | | | | | | | | | | | | | | | |
| | V-Cap RC | | | | | | | | | | | | | | | | |
| Initiator | Darocur TPO | 5 | 5 | 5 | 5 | 5 | 5 | 5 | 5 | 5 | 5 | 5 | 5 | 5 | 5 | 5 | 5 |
| | Irgacure 369 | 5 | 5 | 5 | 5 | 5 | 5 | 5 | 5 | 5 | 5 | 5 | 5 | 5 | 5 | 5 | 5 |
| Surface tension adjusting agent | BYK 378 | 1.25 | 1.50 | 1.75 | 2.00 | 3.75 | 4.00 | 4.25 | 4.50 | | | | | | | | |
| | BYK 348 | 0.50 | 0.50 | 0.50 | 0.50 | 0.50 | 0.50 | 0.50 | 0.50 | | | | | | | | |
| | Tego 450 | | | | | | | | | 1.25 | 1.50 | 1.75 | 2.00 | 3.75 | 4.00 | 4.25 | 4.50 |
| | Tego 432 | | | | | | | | | 0.50 | 0.50 | 0.50 | 0.50 | 0.50 | 0.50 | 0.50 | 0.50 |
| Results | Image quality | | ⊚ | | | | ⊚ | | | | ⊚ | | | | ⊚ | | |
| | Image quality over time | | ⊚ | | | | ⊚ | | | | ⊚ | | | | ⊚ | | |

| | | Example 5 | | | | Example 6 | | | | Example 7 | | | | Example 8 | | | |
|---|---|---|---|---|---|---|---|---|---|---|---|---|---|---|---|---|---|
| Pigment dispersion product | | 5-1 | 5-2 | 5-3 | 5-4 | 6-1 | 6-2 | 6-3 | 6-4 | 7-1 | 7-2 | 7-3 | 7-4 | 8-1 | 8-2 | 8-3 | 8-4 |
| | A | 20 | | | | 20 | | | | 20 | | | | 20 | | | |
| | B | | | | | | | | | | | | | | | | |
| | C | | 20 | | | | 20 | | | | 20 | | | | 20 | | |
| | D | | | | | | | | | | | | | | | | |

TABLE 2-continued

| | | Examples | | | | | | | | | | | | | | | |
|---|---|---|---|---|---|---|---|---|---|---|---|---|---|---|---|---|---|
| | E | | 20 | | | | 20 | | | | 20 | | | | 20 | | |
| | F | | | | | | | | | | | | | | | | |
| | G | | | 20 | | | | 20 | | | | 20 | | | | 20 | |
| Monomer | Laromer DPGDA | 35 | 35 | 35 | 35 | 40 | 40 | 40 | 40 | 40 | 40 | 40 | 40 | 40 | 40 | 40 | 40 |
| | VEEA | | | | | | | | | | | | | 20 | 20 | 20 | 20 |
| | DVE-3 | 35 | 35 | 35 | 35 | | | | | | | | | | | | |
| | Viscoat 260 | | | | | 30 | 30 | 30 | 30 | | | | | | | | |
| | SR 595 | | | | | | | | | 30 | 30 | 30 | 30 | | | | |
| | V-Cap RC | | | | | | | | | | | | | 10 | 10 | 10 | 10 |
| Initiator | Darocur TPO | 5 | 5 | 5 | 5 | 5 | 5 | 5 | 5 | 5 | 5 | 5 | 5 | 5 | 5 | 5 | 5 |
| | Irgacure 369 | 5 | 5 | 5 | 5 | 5 | 5 | 5 | 5 | 5 | 5 | 5 | 5 | 5 | 5 | 5 | 5 |
| Surface tension adjusting agent | BYK 378 | 1.25 | 1.50 | 1.75 | 2.00 | 1.25 | 1.50 | 1.75 | 2.00 | 1.25 | 1.50 | 1.75 | 2.00 | 1.25 | 1.50 | 1.75 | 2.00 |
| | BYK 348 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 | 0.50 |
| | Tego 450 | | | | | | | | | | | | | | | | |
| | Tego 432 | | | | | | | | | | | | | | | | |
| Results | Image quality | | ◎ | | | | ◎ | | | | ◎ | | | | ◎ | | |
| | Image quality over time | | ◎ | | | | ◎ | | | | ◎ | | | | ◎ | | |

TABLE 3

Example and Comparative examples

| | | Example 9 | | | | Example 10 | | | | Example 11 | | | | Example 12 | | | | Comparative example 1 | | | |
|---|---|---|---|---|---|---|---|---|---|---|---|---|---|---|---|---|---|---|---|---|---|
| | | 9-1 | 9-2 | 9-3 | 9-4 | 10-1 | 10-2 | 10-3 | 10-4 | 11-1 | 11-2 | 11-3 | 11-4 | 12-1 | 12-2 | 12-3 | 12-4 | H1-1 | H1-2 | H1-3 | H1-4 |
| Pigment dispersion product | A | 20 | | | | 20 | | | | 20 | | | | 20 | | | | 20 | | | |
| | B | | 20 | | | | 20 | | | | 20 | | | | 20 | | | | 20 | | |
| | C | | | 20 | | | | 20 | | | | 20 | | | | 20 | | | | 20 | |
| | D | | | | 20 | | | | 20 | | | | 20 | | | | 20 | | | | 20 |
| | E | | | | | | | | | | | | | | | | | | | | |
| | F | | | | | | | | | | | | | | | | | | | | |
| | G | | | | | | | | | | | | | | | | | | | | |
| Monomer | Laromer DPGDA | 30 | 30 | 30 | 30 | | | | | | | | | | | | | | | | |
| | VEEA | | | | | 35 | 35 | 35 | 35 | 35 | 35 | 35 | 35 | 35 | 35 | 35 | 35 | 35 | 35 | 35 | 35 |
| | DVE-3 | 40 | 40 | 40 | 40 | | | | | | | | | | | | | | | | |
| | Viscoat 260 | | | | | 35 | 35 | 35 | 35 | 35 | 35 | 35 | 35 | 35 | 35 | 35 | 35 | 35 | 35 | 35 | 35 |
| | SR 595 | | | | | | | | | | | | | | | | | | | | |
| | V-Cap RC | | | | | | | | | | | | | | | | | | | | |
| Initiator | Darocur TPO | 5 | 5 | 5 | 5 | 5 | 5 | 5 | 5 | 5 | 5 | 5 | 5 | 5 | 5 | 5 | 5 | 5 | 5 | 5 | 5 |
| | Irgacure 369 | 5 | 5 | 5 | 5 | 5 | 5 | 5 | 5 | 5 | 5 | 5 | 5 | 5 | 5 | 5 | 5 | 5 | 5 | 5 | 5 |
| Surface tension adjusting agent | BYK 378 | 1.25 | 1.50 | 1.75 | 2.00 | 1.75 | 2.00 | 2.25 | 2.50 | | | | | 1.20 | 1.20 | 1.20 | 1.40 | | | | |
| | BYK 348 | 0.50 | 0.50 | 0.50 | 0.50 | | | | | | | | | | | | | | | | |
| | Tego 450 | | | | | | | | | 0.48 | 0.48 | 0.48 | 0.56 | | | | | | | | |
| | Tego 432 | | | | | | | | | 0.72 | 0.72 | 0.72 | 0.84 | | | | | | | | |
| Results | Image quality | ◎ | ◎ | ◎ | ◎ | ◎ | ◎ | ◎ | ◎ | ◎ | ◎ | ◎ | ◎ | ◎ | ◎ | ◎ | ◎ | | X | X | |
| | Image quality over time | ○ | ○ | ○ | ○ | ○ | ○ | ○ | ○ | ○ | ○ | ○ | ○ | ○ | ○ | ○ | ○ | | | | |

| | | Comparative example 2 | | | | Comparative example 3 | | | | Comparative example 4 | | | | Comparative example 5 | | | | |
|---|---|---|---|---|---|---|---|---|---|---|---|---|---|---|---|---|---|---|
| | | H2-1 | H2-2 | H2-3 | H2-4 | H3-1 | H3-2 | H3-3 | H3-4 | H4-1 | H4-2 | H4-3 | H4-4 | H5-1 | H5-2 | H5-3 | H5-4 | H5-5 |
| Pigment dispersion product | A | 20 | | | | 20 | | | | 20 | | | | 20 | | | | |
| | B | | 20 | | | | 20 | | | | 20 | | | | 20 | | | |
| | C | | | 20 | | | | 20 | | | | 20 | | | | 20 | | |
| | D | | | | 20 | | | | 20 | | | | 20 | | | | 20 | |
| | E | | | | | | | | | | | | | | | | | 20 |
| | F | | | | | | | | | | | | | | | | | |
| | G | | | | | | | | | | | | | | | | | |
| Monomer | Laromer DPGDA | | | | | | | | | | | | | | | | | |
| | VEEA | 35 | 35 | 35 | 35 | 35 | 35 | 35 | 35 | 35 | 35 | 35 | 35 | 35 | 35 | 35 | 35 | 35 |
| | DVE-3 | | | | | | | | | | | | | | | | | |
| | Viscoat 260 | 35 | 35 | 35 | 35 | 35 | 35 | 35 | 35 | 35 | 35 | 35 | 35 | 35 | 35 | 35 | 35 | 35 |
| | SR 595 | | | | | | | | | | | | | | | | | |
| | V-Cap RC | | | | | | | | | | | | | | | | | |
| Initiator | Darocur TPO | 5 | 5 | 5 | 5 | 5 | 5 | 5 | 5 | 5 | 5 | 5 | 5 | 5 | 5 | 5 | 5 | 5 |
| | Irgacure 369 | 5 | 5 | 5 | 5 | 5 | 5 | 5 | 5 | 5 | 5 | 5 | 5 | 5 | 5 | 5 | 5 | 5 |
| Surface tension adjusting agent | BYK 378 | 0.50 | 0.75 | 1.00 | 1.25 | 4.25 | 4.50 | 4.75 | 5.00 | 1.75 | 2.50 | 3.25 | 4.00 | 1.50 | 2.00 | 2.50 | 3.00 | 4.00 |
| | BYK 348 | 0.25 | 0.25 | 0.25 | 0.25 | 0.50 | 0.50 | 0.50 | 0.50 | 0.50 | 0.50 | 0.50 | 0.50 | 0.50 | 0.50 | 0.50 | 0.50 | 0.50 |
| | Tego 450 | | | | | | | | | | | | | | | | | |

TABLE 3-continued

| Results | | | | |
|---|---|---|---|---|
| Tego 432 | | | | |
| Image quality | △ | ○ | X | X |
| Image quality over time | △ | X | X | X |

| | | |
|---|---|---|
| Laromer DPGDA | Dipropylene glycol diacrylate | BASF |
| VEEA | 2-(2-vinyloxyethoxy)ethyl acrylate | NIPPON SHOKUBAI CO., LTD. |
| DVE-3 | Triethylene glycol divinyl ether | ISP |
| Viscoat 260 | 1,9-nonanediol diacrylate | OSAKA ORGANIC CHEMICAL INDUSTRY LTD. |
| SR 595 | 1,10-decanediol diacrylate | SARTOMER |
| V-Cap RC | Vinylcaprolactam | ISP |
| Darocur TPO | 2,4,6-trimethylbenzoyl-diphenyl-phosphine oxide | BASF |
| Irgacure 369 | 2-benzyl-2-dimethylamino-1-(4-morpholinophenyl)-buthanone-1 | BASF |
| BYK 378 | Polyether modified polydimethylsiloxane | BYK Japan KK |
| BYK 348 | Polyether modified siloxane | BYK Japan KK |
| Tego 450 | Polyether modified polysiloxane copolymer | Evonik Degussa Japan |
| Tego 432 | Polyether modified polysiloxane copolymer | Evonik Degussa Japan |

What is claimed is:

1. An active energy ray-curable inkjet ink set, comprising at least two inks, each of which has different color,
    wherein each ink comprises a surface tension adjusting agent in an amount of 1.0 to 5.0% by weight with respect to a total amount of each ink,
    wherein the amount of the surface tension adjusting agent in each ink is increased by greater than 0% by weight and not more than 0.5% by weight with respect to a total amount of each of the two inks which are jetted in a continuous order,
    wherein the surface tension adjusting agent is two or more silicone surface tension adjusting agents, and
    a difference between maximum and minimum in the amount of the surface tension adjusting agent in each ink is 2% by weight or less.

2. The active energy ray-curable inkjet ink set according to claim 1, further comprising 50 to 95% by weight of monomer having ethylene oxide or polyethylene oxide as a main skeleton with respect to the total amount of the ink.

3. The active energy ray-curable inkjet ink set according to claim 1, which is used for a one-pass printer of discharging an ink by at least two or more of inkjet heads, and then hardening the inks simultaneously.

* * * * *